US010684709B2

(12) United States Patent
Wang et al.

(10) Patent No.: US 10,684,709 B2
(45) Date of Patent: Jun. 16, 2020

(54) ELECTRONIC BAGS

(71) Applicant: SHENZHEN ROYOLE TECHNOLOGIES CO. LTD., Shenzhen, Guangdong (CN)

(72) Inventors: Chaogang Wang, Guangdong (CN); Fan Yang, Guangdong (CN)

(73) Assignee: SHENZHEN ROYOLE TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/124,581

(22) Filed: Sep. 7, 2018

(65) Prior Publication Data
US 2018/0364829 A1  Dec. 20, 2018

Related U.S. Application Data

(63) Continuation-in-part of application No. 15/361,775, filed on Nov. 28, 2016, now Pat. No. 10,114,413.

(30) Foreign Application Priority Data

Dec. 22, 2015 (CN) ............... 2015 2 1077236 U

(51) Int. Cl.
*G06F 3/041* (2006.01)
*G06F 1/16* (2006.01)
(Continued)

(52) U.S. Cl.
CPC ............. *G06F 3/041* (2013.01); *A45F 3/04* (2013.01); *G06F 1/163* (2013.01); *G06F 1/169* (2013.01);
(Continued)

(58) Field of Classification Search
CPC ...... G06F 1/163; G06F 1/1652; G06F 1/1654; G06F 3/041; G06F 3/0488;
(Continued)

(56) References Cited

U.S. PATENT DOCUMENTS 7,805,114 B1 * 9/2010 Quintana ............... G06F 1/163
370/338
9,223,494 B1 * 12/2015 DeSalvo ............ G06F 3/0488
(Continued)

FOREIGN PATENT DOCUMENTS

CN  202489401   10/2012
CN  203105947    8/2013
(Continued)

OTHER PUBLICATIONS

Piotr Boruslawski, "brakepack by artefact solves the failed dialogue between cyclists and motorists", May 14, 2015, XP055353625, Retrieved from the Internet: URL: http://www.designboom.com/technology/artefact-brakepack-05-14-2015/.
(Continued)

*Primary Examiner* — Tom V Sheng
(74) *Attorney, Agent, or Firm* — Hauptman Ham, LLP

(57) ABSTRACT

The present disclosure provides an electronic bag. The electronic bag includes a main body, a display device arranged on the main body, and a touch control device detachably connected to the main body. The touch control device is in communication with the display device.

20 Claims, 9 Drawing Sheets

(51) Int. Cl.
  *G06F 3/0488* (2013.01)
  *G09G 5/00* (2006.01)
  *A45F 3/04* (2006.01)
  *G06F 3/147* (2006.01)
  *A45F 3/00* (2006.01)
  *A45C 3/06* (2006.01)
  *A45C 3/02* (2006.01)
  *A45C 5/03* (2006.01)
  *A45C 15/00* (2006.01)
  *A45F 3/02* (2006.01)

(52) U.S. Cl.
  CPC .......... *G06F 1/1652* (2013.01); *G06F 1/1654* (2013.01); *G06F 3/04883* (2013.01); *G06F 3/147* (2013.01); *G09G 5/003* (2013.01); *A45C 3/02* (2013.01); *A45C 3/06* (2013.01); *A45C 5/03* (2013.01); *A45C 15/00* (2013.01); *A45F 3/005* (2013.01); *A45F 3/02* (2013.01); *A45F 2003/003* (2013.01); *G06F 2203/04102* (2013.01); *G09G 2354/00* (2013.01); *G09G 2370/16* (2013.01); *G09G 2380/02* (2013.01)

(58) Field of Classification Search
  CPC ...... G06F 3/04883; G06F 3/165; G06F 3/167; G06F 1/1692; G06F 2203/04102; A45C 3/00; A45C 3/001; A45C 3/02; A45C 3/03; A45C 3/06; A45C 5/02; A45C 5/03; A45C 13/001; A45C 15/00; A45F 3/02; A45F 3/005; A45F 3/04; A45F 2003/001; A45F 2003/003; G09G 5/003; G09G 5/36; G09G 2354/00; G09G 2380/02
  See application file for complete search history.

(56) References Cited

U.S. PATENT DOCUMENTS

| | | | | |
|---|---|---|---|---|
| 9,781,243 | B1* | 10/2017 | Huang | H04W 4/70 |
| 10,180,334 | B2* | 1/2019 | Uchimura | H04M 1/7253 |
| 2007/0199844 | A1* | 8/2007 | Daley, III | A45C 5/02 |
| | | | | 206/320 |
| 2008/0156606 | A1 | 7/2008 | Entner | |
| 2011/0051349 | A1* | 3/2011 | Daley, III | G06F 1/1628 |
| | | | | 361/679.27 |
| 2011/0283241 | A1 | 11/2011 | Miller et al. | |
| 2013/0298080 | A1* | 11/2013 | Griffin | G06F 3/0487 |
| | | | | 715/834 |
| 2015/0133193 | A1* | 5/2015 | Stotler | G06F 1/163 |
| | | | | 455/557 |
| 2015/0227164 | A1* | 8/2015 | Laycock | G06F 1/163 |
| | | | | 345/82 |
| 2015/0279171 | A1 | 10/2015 | Hyde | |
| 2015/0279172 | A1 | 10/2015 | Hyde | |
| 2017/0177208 | A1* | 6/2017 | You | G06F 3/0488 |

FOREIGN PATENT DOCUMENTS

| | | |
|---|---|---|
| CN | 204617309 | 9/2015 |
| CN | 204861731 | 12/2015 |
| JP | 59-189532 | 12/1984 |
| JP | 62-40698 | 3/1987 |
| JP | 7-36607 | 2/1995 |
| JP | 11-143634 | 5/1999 |
| JP | 2003-343 | 1/2003 |
| JP | 2003-84680 | 3/2003 |
| JP | 2005-18048 | 1/2005 |
| JP | 3116814 | 12/2005 |
| JP | 3121960 | 6/2006 |
| JP | 2011-10766 | 1/2011 |
| JP | 2011-135525 | 7/2011 |
| JP | 5531612 | 6/2014 |
| JP | 3194774 | 12/2014 |
| KR | 2020110011650 U | 12/2011 |
| TW | M486320 | 9/2014 |
| WO | 2013150665 | 10/2013 |

OTHER PUBLICATIONS

Communication pursuant to Article 94(3) EPC dated Feb. 15, 2018 from corresponding application No. EP 16198925.6.

Office Action dated Dec. 26, 2017 from corresponding application No. JP 2016-245698.

Office Action dated Mar. 7, 2018 from corresponding application No. KR 10-2016-0176475.

* cited by examiner

ELECTRONIC BAGS

CROSS REFERENCE TO RELATED APPLICATIONS

This application is a continuation-in-part of U.S. patent application Ser. No. 15/361,775, filed on Nov. 28, 2016, which claims priority to Chinese Patent Application No. 201521077236.1, filed on Dec. 22, 2015, contents of which are hereby incorporated by reference in their entireties.

FIELD OF THE TECHNICAL

The present disclosure relates to bags, and particularly to electronic bags.

BACKGROUND

In daily life, people often keep different kinds of goods in different kinds of bags. The bags bring convenience to daily life. With the development of living standards, more and more kinds of bags are developed to satisfy user's different needs. However, presently, most kinds of bags just have storage function.

SUMMARY

The present disclosure provides electronic bags.

In a first aspect, an electronic bag is provided. The electronic bag includes a main body, a display device arranged on the main body, and a touch control device detachably connected to the main body, and in communication with the display device.

In a second aspect, an electronic bag is provided. The electronic bag includes a main body, a display device connected to the main body, and a touch control device detachably connected to the main body. The touch control device is operable to transmit electrical signal to the display device, to control the display device to display.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

Figure 1:
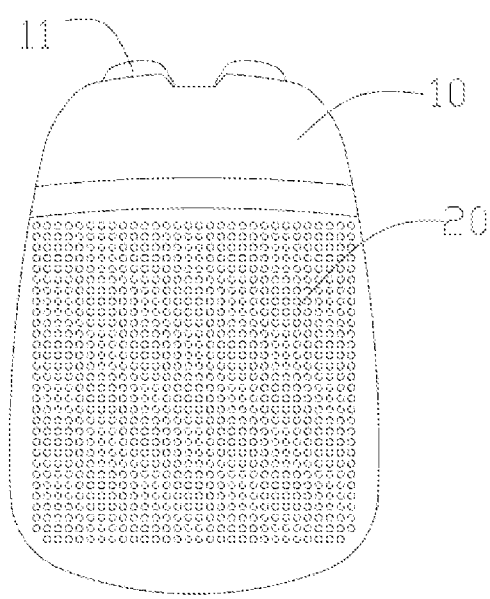
FIG. 1 is a front view of an electronic bag in accordance with an embodiment of the present disclosure, illustrating a display device arranged on a front surface of the electronic bag.
Figure 2:
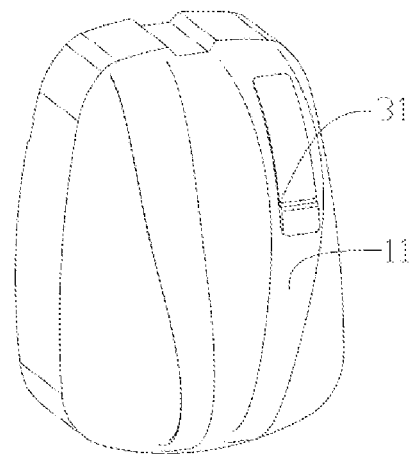
FIG. 2 is a perspective view of the electronic bag of FIG. 1, illustrating a touch control device arranged on a strap of the electronic bag.

Referring to FIGS. 1-2, an electronic bag in accordance with an embodiment of the present disclosure is shown. In the embodiment, the electronic bag is a backpack. In an alternative embodiment, the electronic bag may be a shoulder bag, a waist bag, a brief bag, a hand bag, a messenger bag, or a suitcase.

In the embodiment, the electronic bag includes a main body which includes a bag body 10 equipped with two straps 11. In the embodiment, the electronic bag further includes a display device 20 arranged on the main body and a first touch control device 31 detachably connected to the main body. The first touch control device 31 is detachably connected to the strap 11 and is in communication with the display device 20. The communication between the first touch device 31 and the display device 20 may be wireless or wire.

In the embodiment, the first touch control device 31 can receive an operation such as a touch gesture performed on the first touch control device 31 and control the display device 20 to display contents according to the operation performed on the first touch control device 31, for example, control the display device 20 to display a pattern corresponding to the touch gesture. Alternatively, the first touch control device 31 may transmit information of an operation performed on the first touch control device 31 to the display device 20, and the display device 20 determines to-be-displayed contents according to the received information from the first touch control device 31. Specific implementations will be described hereinafter.

The first touch control device 13 may include a flexible touch sensor which can sense user's touch to generate electric signal. In the embodiment, the first touch control device 31 is flexible, and can be bent to the shape of a ring, such that after the first touch control device 31 is separated from the strap 11, the first touch control device 31 can be bent and worn on a wrist of a user or a handle of a bike or a motorcycle of the user, thereby facilitating user's operation on the first touch control device 31. That is to say, the user can select to arrange the first touch control device 31 on the strap 11 or wear on the wrist or the handle of the bike or motorcycle according to actual usage. Therefore, the user can operate the handle of the bike or motorcycle or the wrist thereof to control the display device, sometimes more convenience is achieved.

Figure 3:
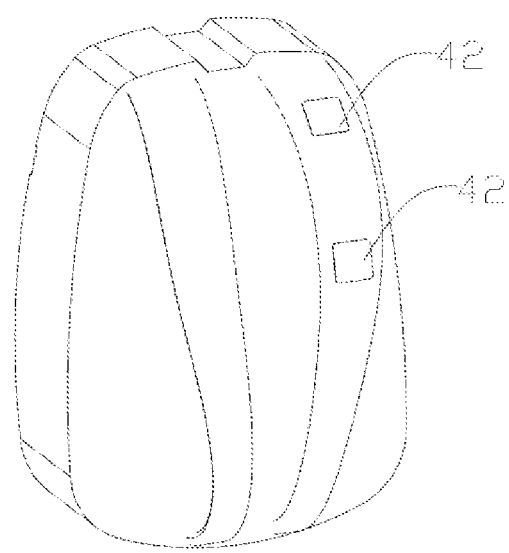
FIG. 3 is similar to FIG. 2, illustrating the strap of the electronic bag being provided with first magic tapes with the touch control device being removed for clarity.
Figure 4:
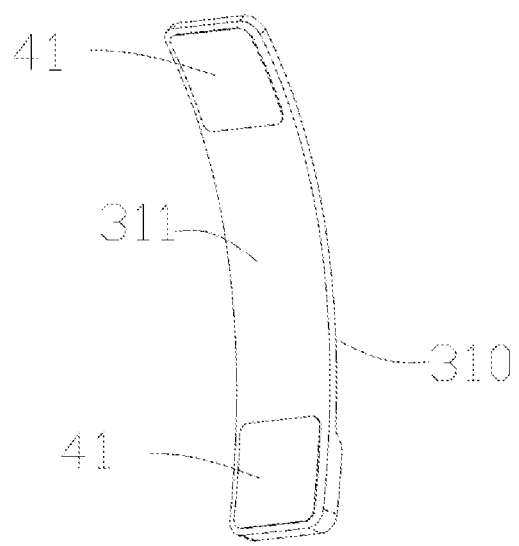
FIG. 4 is a perspective view of the touch control device of FIG. 2, illustrating the touch control device being provided with second magic tapes.

Further referring to FIGS. 3-4, in the embodiment, the first touch control device 31 is detachably connected to the strap 11 of the display device 20 via connection portions such as magic tapes. The first touch control device 31 has a first surface 310 and a second surface 311 opposite to the first surface 310. The first surface 310 is operable to allow an object to touch the first surface 310 to input instruction to the first touch control device 31. The object may be a user finger, a stylus pen and the like. The second surface 311 is provided with first connection portions 41. The strap 11 is also provided with second connection portions 42. The arrangement of the first connection portions 41 on the second surface 311 is adapted to that of the second connection portions 42 on the strap 11, such that the first touch control device 31 can be detachably connected to the strap 11 via the first and second portions 41 and 42. Besides the magic tapes, the first connection portions 41 may also be first magnets, and the second connection portions 42 may be second magnets which can attract the first magnets. Particularly, the two first connection portions 41 of the first touch control device 31 may also be detachably connected to each other, so that the first touch control device 31 may be bended to a ring and keep the ring shape by attaching the two first connection portions 41 with each other. Alternatively, the first touch control device 31 may be bent to maintain the ring shape without any connection portions of the first touch control device 31, i.e., after the first touch control device 31 is bent, the ring shape is maintained to be worn on the handle of the bike or motorcycle or the wrist of the user.

Figure 5:
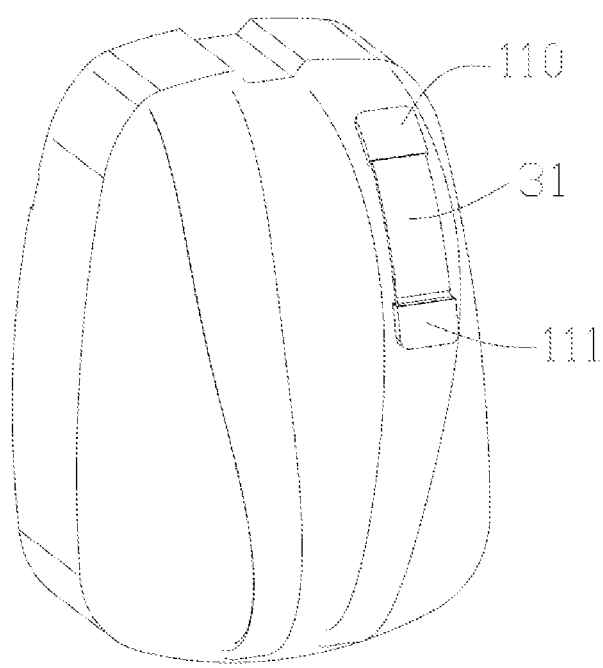
FIG. 5 is a perspective view of an electronic bag in accordance with another embodiment of the present disclosure, illustrating a strap of the electronic bag being provided with pockets for receiving a touch control device.
Figure 6:
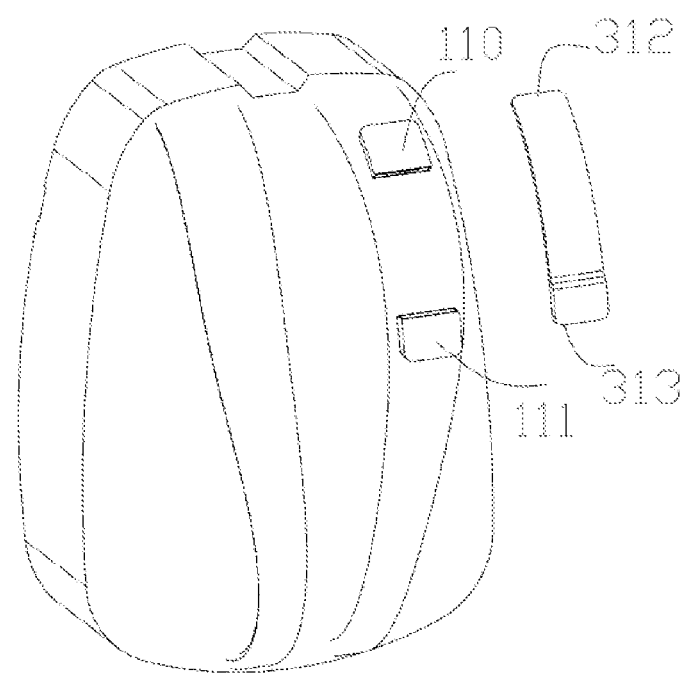
FIG. 6 is a partial, exploded perspective view of the electronic bag of FIG. 5.

Referring to FIGS. 5-6, the first touch control device 31 is detachably connected to the strap 11 in a manner different from that described above. In the implementation, the strap 11 is provided with two pockets 110 and 111. The first touch control device 31 has two opposite ends 312 and 313. The shape of the pocket 110 is adapted to that of the end 312, and the shape of the pocket 111 is adapted to that of the end 313, such that the ends 312 and 313 can be received in the pockets 110 and 111, respectively. Thus, the first touch control device 31 can be detachably connected to the strap 11.

What is needed to further illustrate is that the above just illustrate several manners in which the first touch control device 31 is detachably connected to the strap 11, and the first touch control device 31 can be detachably connected to the strap 11 in other manners, such as using fixing elements (e.g., a clip) to attach the first touch control device 31 to the strap 11, and the present disclosure is not limited thereto.

Figure 7:
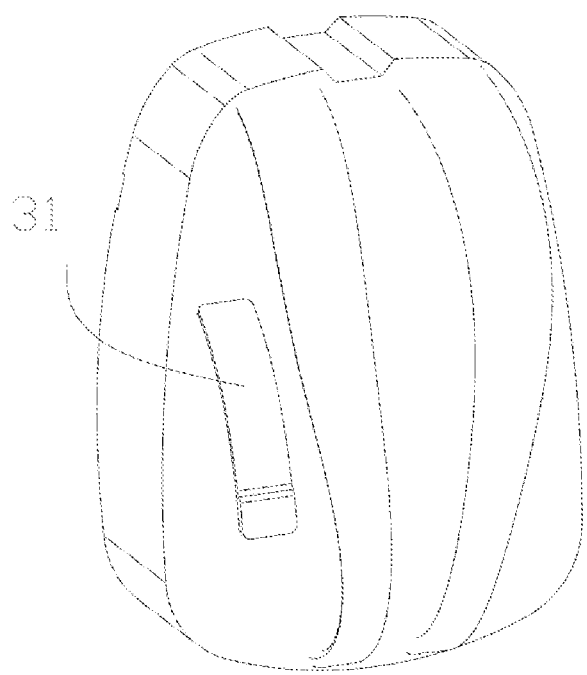
FIG. 7 is a perspective view of an electronic bag in accordance with yet another embodiment of the present disclosure, illustrating a touch control device of the electronic bag being arranged on a back surface of the electronic bag.

In alternative embodiments, the first touch control device 31 can be detachably connected to other positions of the electronic bag. As illustrated in FIG. 7, the first touch control device 31 is detachably connected to a back surface of the electronic bag. The manner in which the first touch control device 31 is detachably connected to the side surface of the electronic bag may be any of the above manners, and details will not be repeated herein. It is understood, the separated first touch control device 31 can be detachably attached to any position of the electronic bag according to requirements, for example, a bottom surface of the electronic bag, a top surface of the electronic bag, a side surface of the electronic bag, or even interior of the bag. For example, a user may move the first touch control device 13 from the strap 11 to the side surface of the electronic bag, for facilitating operation thereof.

In the embodiment, the first touch control device 31 may be a resistive touch control device, a capacitive touch control device, an infrared touch control device, or a surface acoustic wave touch control device.

In the embodiment, the first touch control device 31 is in wireless communication with the display device 20. For example, the first touch control device 31 may be equipped with a signal transmitter, and the display device 20 may be equipped with a signal receiver, such as an infrared transmitter and an infrared receiver. The first touch control device 31 may be provided with an independent power source and controller, such that when the first touch control device 31 is separated from the electronic bag, the first touch control device 31 can be work normally. Certainly, the electronic bag has a power source installed therein to provide power to the electronic bag such as the display device 20.

In the embodiment, the display device 20 is arranged on the front surface of the bag body 10, that is, the display device 20 is arranged opposite to the strap 11. In an alternative embodiment, the display device 20 can be arranged on the side surface of the bag body 10, adjacent to the strap 11. An area of the first touch control device 31 may be smaller than that of the display device 20.

In the embodiment, the display device 20 may be a display device having an LED lattice screen or a flexible display device such as OLED display.

In the embodiment, the display device 20 is substantially rectangular. In an alternative embodiment, the display device 20 may be a display device of arbitrary shape, for example, a round display device, an elongated display device, or an irregular display device.

The following will specifically illustrate how the touch control device 31 controls the display device 20 to display contents.

Figure 8:
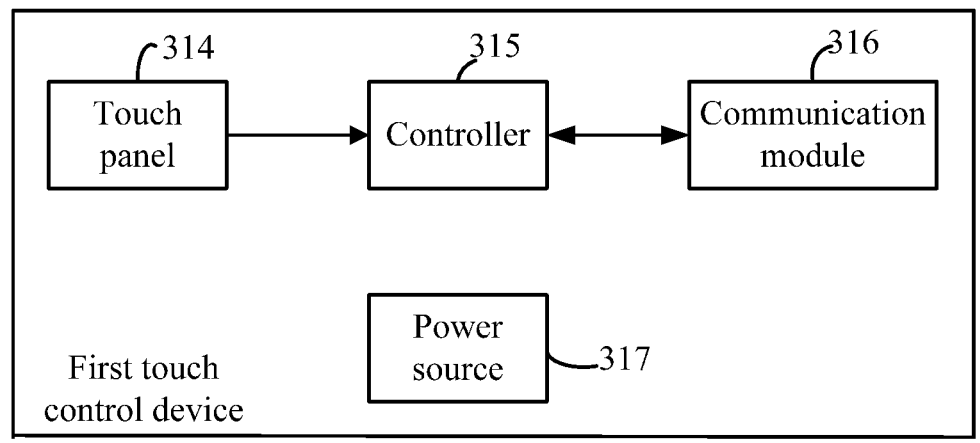
FIG. 8 is a block diagram of a first touch control device in accordance with the embodiment of the present disclosure.

Referring to FIG. 8, the touch control device 31 includes a touch panel 314, a controller 315, a communication module 316, and a power source 317. The touch sensor may be incorporated in the touch panel 314. The power source 317 supplies power to the touch panel 314, the controller 315, and the communication module 316. The communication module 316 may be a wireless communication module to realize wireless communication between the touch control device 31 and the display device 20. The touch panel 314 is operable to receive operations performed on the touch panel 314. The controller 315 is operable to control the display device 20 to display contents according to operations performed on the touch panel 314.

Figure 9:
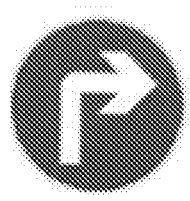
FIG. 9 is a schematic view illustrating a right turn sign in accordance with the embodiment of the present disclosure.

In the embodiment, when a touch gesture is performed on the touch panel 314, the controller 315 controls the display device 20 to display a pattern corresponding to the touch gesture. In an implementation, a preset correspondence relationship between patterns and touch gestures is stored in the touch control device 31 in advance. In the relationship, each touch trace corresponds to an identifier of a pattern, for example, an identifier "right" indicating a right turn sign (as illustrated in FIG. 9), and an identifier "left" indicating a left turn sign, and in the relationship, the touch trace of sliding towards right corresponds to the identifier "right", and the touch trace of sliding towards left corresponds to the identifier "left", and so on. The controller 315 is operable to control the display device 20 to display a pattern according to the touch gesture and the relationship. For example, when the user slides towards right on the touch panel 314, the right turn sign is displayed on the display device 20. In an alternative embodiment, many preset patterns are stored in the controller 315 beforehand. Each preset pattern corresponds to one touch trace. When the touch gesture meets a predetermined touch trace, a corresponding preset pattern is displayed. For example, when the user slides downwardly on the first touch control device 31, a stop sign such as a triangle containing "stop" therein is displayed on the display device 20, and when the user slides upwardly on the first touch control device 31, an acceleration sign such as a circle containing "acceleration" therein is displayed on the display device 20. In yet another implementation, the controller 315 controls the display device 20 to display a pattern according to a trace of the touch gesture. For example, when the user draws a circle on the first touch control device 31, a circle is displayed on the display device 20. When the user writes "stop" on the first touch control device 31, "stop" is displayed on the display device 20. That is to say, the displayed pattern is the same as or similar to the trace of the touch gesture. A rightwardly sliding gesture on the first touch panel 314 will result in a rightwardly sliding line displayed on the display device 20, rather than a right turn sign.

Alternatively, the first touch control device 31 merely transmits information of an operation such as a touch gesture performed on the touch panel 314 to the display device 20, and the display device 20 determines to-be-displayed contents according to the information of the operation, and the specific manner in which the display device determines to-be-displayed contents according to the received information of an operation from the first touch control device 31 may be similar to the above mentioned manners in which the first touch control device 31 itself determines to-be-displayed contents. For example, when the received information of the operation from the first touch control device 31 indicates that the operation is sliding towards right, the display device 20 determines to display the right turn sign.

Figure 10:
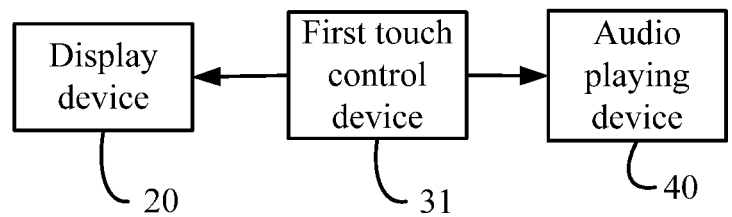
FIG. 10 is a block diagram of the electronic bag in accordance with the embodiment of the present disclosure.

Referring to FIG. 10, in an embodiment, the electronic bag may further include an audio playing device 40. The audio playing device 40 may be arranged on the bottom surface of the electronic bag. The audio playing device 40 may store music files and have a speaker to output audio signals. The first touch control device 31 is in communication with the audio playing device 40 to control playback of audio signals. The power source installed in the electronic bag can also provide power to the audio playing device 40. The first touch control device 31 may be in wireless communication with the audio playing device 40. For example, the audio playing device 40 is also provided with one infrared receiver. The first touch control device 31 can be operable to control the display device 20 to display different patterns and control the audio playing device 40 to play audio signals.

In the embodiment, the first touch control device 31 can define operations for controlling audio playing device 40 in advance (hereinafter, referred as audio control operations for simplification). When the first touch control device 31 determines an audio control operation is performed, the first touch control device 31 generates an audio control instruction according to the audio control operation, and transmits the audio control instruction to the audio playing device 40 to control the audio playing device 40. What is needed to illustrate is that the display device 20 may also receive the audio control instruction, but the display device 20 may not respond to the audio control instruction since the audio control instruction is just for controlling the audio playing device 40. The audio control operations may be operations on a particular region (regions) of the touch panel 314 such as sliding towards right or left on any corner of the touch panel 314. For example, when the user slides towards left or right on one corner of the touch panel 314, the audio playing device 40 is controlled to skip to a previous or next song. Certainly, different gestures may be preset to realize different functions.

In the embodiment, by arranging the audio playing device 40, the electronic bag can play audio signals.

Compared with a traditional bag, besides having storage function, the electronic bag provided by the present disclosure can further display different patterns according to user's needs. Therefore, the electronic bag includes multiple functions, and possesses good application prospect.

Figure 11:
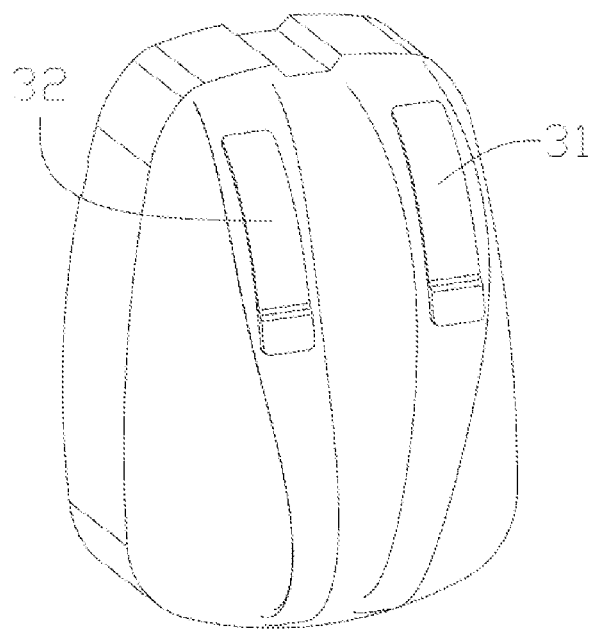
FIG. 11 is a perspective view of an electronic bag in accordance with further yet another embodiment of the present disclosure, illustrating two touch control devices being arranged on two straps of the electronic bag, respectively.

Referring to FIG. 11, in an alternative embodiment, the electronic bag further includes a second touch control device 32. The second touch control device 32 is in communication with the audio playing device 40 to control playback of audio signals. The structure of the second touch control device 32 is the same as that of the first touch control device 31, and unnecessary details will not be described herein.

In the embodiment, the first touch control device 31 and the second touch control device 32 are arranged on the two straps 11 of the electronic bag, respectively. In an alternative embodiment, the second touch control device 32 and the first touch control device 31 can be both arranged on one strap 11. The second touch control device 32 may be detachably connected to the strap 11 in any of the above described manners, or may be fixed to the strap 11.

When the second touch control device 32 is detachably connected to the strap 11, the second touch control device 32 is in wireless communication with the audio playing device 40, and the first touch control device 31 can be set to be just operable to control the display device 20, and the second touch control device 32 can be set to be just operable to control the audio playing device 40.

In an alternative embodiment, the electronic bag may include two or more display devices and two or more touch control devices. One touch control device is in communication with one display device. That is to say, one touch control device is operable to control one display device. Among the touch control devices, at least one of the touch control devices is detachably connected to the main body of the electronic bag, and the remaining of the touch control devices is fixed to the main body of the electronic bag. Alternatively, all of the touch control devices are detachably connected to the main body of the electronic bag.

When the electronic bag includes multiple display devices, different display devices may have different functions. For example, if the electronic bag includes two display devices, one display device is arranged on the front surface of electronic bag for displaying indication signs such as the right turn sign, the stop sign, and so on, and another display device is arranged on the side surface of the electronic bag for displaying some images for example an image of a star to decorate the electronic bag. Certainly, the display devices may have the same function, for example, all the display devices are controlled to display the indication signs, and the user can select to control one display device to display the indication signs according to actual usage.

The foregoing descriptions are merely preferred embodiments of the present disclosure, rather than limiting the present disclosure. Any modification, equivalent substitution, improvement or the like made within the spirit and principle of the present disclosure shall fall into the protection scope of the present disclosure.

What is claimed is:
1. An electronic bag comprising:
a main body;

a display device arranged on the main body; and a touch control device detachably connected to the main body and in communication with the display device, wherein the touch control device is operable to control the display device to display a pattern according to a touch gesture performed on the touch control device and a preset correspondence relationship between patterns and touch gestures.

2. The electronic bag of claim 1, wherein the touch control device is bendable to be kept in the shape of a ring.

3. The electronic bag of claim 1, wherein the touch control device comprises a first connection portion, and the main body comprises a second connection portion detachably connected to the first connection portion.

4. The electronic bag of claim 3, wherein the touch control device further comprises another first connection portion spaced from the first connection portion, and the main body further comprises another second connection portion detachably connected to the another first connection portion.

5. The electronic bag of claim 4, wherein the first connection portion is detachably connected to the another first connection portion to keep the touch control device in a ring when the touch control device is detached from the main body.

6. The electronic bag of claim 3, wherein the first connection portion and the second connection portion are both magic tapes.

7. The electronic bag of claim 3, wherein the second connection portion comprises a pocket, the first connection portion is an end of the touch control device and is detachably received in the pocket.

8. The electronic bag of claim 1, wherein two opposite ends of the touch control device are detachably connected to each other when the touch control device is detached from the main body.

9. The electronic bag of claim 1, wherein the touch control device is operable to control the display device to display a pattern which is preset and stored in a controller of the touch control device.

10. The electronic bag of claim 1, wherein the electronic bag further comprises a strap, the touch control device is detachably connected to the strap.

11. The electronic bag of claim 1, wherein the display device is a flexible display device.

12. The electronic bag of claim 1, wherein the touch control device is in wireless communication with the display device.

13. An electronic bag comprising:

a main body;

a display device connected to the main body; and a touch control device detachably connected to the main body, and operable to transmit electrical signal to the display device, to control the display device to display, wherein two opposite ends of the touch control device are detachably connected to each other to keep the touch control device in a ring when the touch control device is detached from the main body.

14. The electronic bag of claim 13, wherein the touch control device is operable to control the display device to display a pattern which is preset and stored in a controller of the touch control device.

15. The electronic bag of claim 13, wherein the touch control device is operable to be detached from the main body in a direction away from the display device.

16. The electronic bag of claim 13, wherein the touch control device is detachably connected to the main body by magic tapes.

17. The electronic device of claim 13, wherein the touch control device is operable to select a pattern stored in the touch control device beforehand according to a touch gesture performed on the touch control device and control the display device to display the selected pattern.

18. An electronic bag comprising:

a main body;

a display device arranged on the main body; and a touch control device detachably connected to the main body and in communication with the display device, wherein two opposite ends of the touch control device are detachably connected to each other when the touch control device is detached from the main body.

19. The electronic bag of claim 18, wherein the touch control device is operable to control the display device to display a pattern according to a touch gesture performed on the touch control device and a preset correspondence relationship between patterns and touch gestures.

20. The electronic device of claim 18, wherein the touch control device is operable to select a pattern stored in the touch control device beforehand according to a touch gesture performed on the touch control device and control the display device to display the selected pattern.

* * * * *